(12) United States Patent
Sieklik

(10) Patent No.: US 11,502,558 B2
(45) Date of Patent: Nov. 15, 2022

(54) INDUCTIVE POWER TRANSFER DEVICE

(71) Applicant: NXP USA, Inc., Austin, TX (US)

(72) Inventor: Ivan Sieklik, Martin (SK)

(73) Assignee: NXP USA, Inc., Austin, TX (US)

( * ) Notice: Subject to any disclaimer, the term of this patent is extended or adjusted under 35 U.S.C. 154(b) by 365 days.

(21) Appl. No.: 16/672,849

(22) Filed: Nov. 4, 2019

(65) Prior Publication Data

US 2021/0135508 A1 May 6, 2021

(51) Int. Cl.
*H02J 50/90* (2016.01)
*H02J 50/10* (2016.01)
*H02J 7/02* (2016.01)

(52) U.S. Cl.
CPC ............. *H02J 50/90* (2016.02); *H02J 7/025* (2013.01); *H02J 50/10* (2016.02)

(58) Field of Classification Search
CPC ...................................... H02J 50/90
USPC ........................................ 320/108
See application file for complete search history.

(56) References Cited

U.S. PATENT DOCUMENTS

| 8,326,251 B2 | 12/2012 | Swarts et al. | |
| 2010/0259217 A1* | 10/2010 | Baarman | H02J 7/0044 |
| | | | 320/108 |
| 2018/0226815 A1* | 8/2018 | Yamanishi | H02J 7/0042 |
| 2018/0323660 A1* | 11/2018 | Lee | H02J 7/025 |
| 2020/0161909 A1* | 5/2020 | Deng | H02J 50/90 |
| 2021/0028655 A1* | 1/2021 | Goodchild | H02J 50/80 |
| 2021/0075261 A1* | 3/2021 | Chen | H02J 7/0047 |

FOREIGN PATENT DOCUMENTS

| CN | 105914906 A | 8/2016 | |
| CN | 105914906 B | 8/2016 | |
| CN | 108151635 A | 6/2018 | |
| KR | 20130106706 | * 9/2013 | ............... H02J 7/02 |

* cited by examiner

*Primary Examiner* — Edward Tso
*Assistant Examiner* — Ahmed H Omar

(57) ABSTRACT

One example discloses an inductive power transmit device, including: a power controller configured to be coupled to a set of primary inductive coils; wherein the power controller is configured to supply power to a first subset of the primary coils; wherein the first subset of primary coils are configured to inductively transfer power to a set of secondary inductive coils; wherein the power controller is configured to supply the power to a second subset of the primary coils in response to a threshold movement of the secondary inductive coils with respect to the primary inductive coils; and wherein the power controller is configured to determine the movement based on the power supplied to the first subset of primary coils, and a ratio of power supplied to one primary coil in the first subset of primary coils as compared to power supplied to all coils in the first subset of coils.

20 Claims, 14 Drawing Sheets

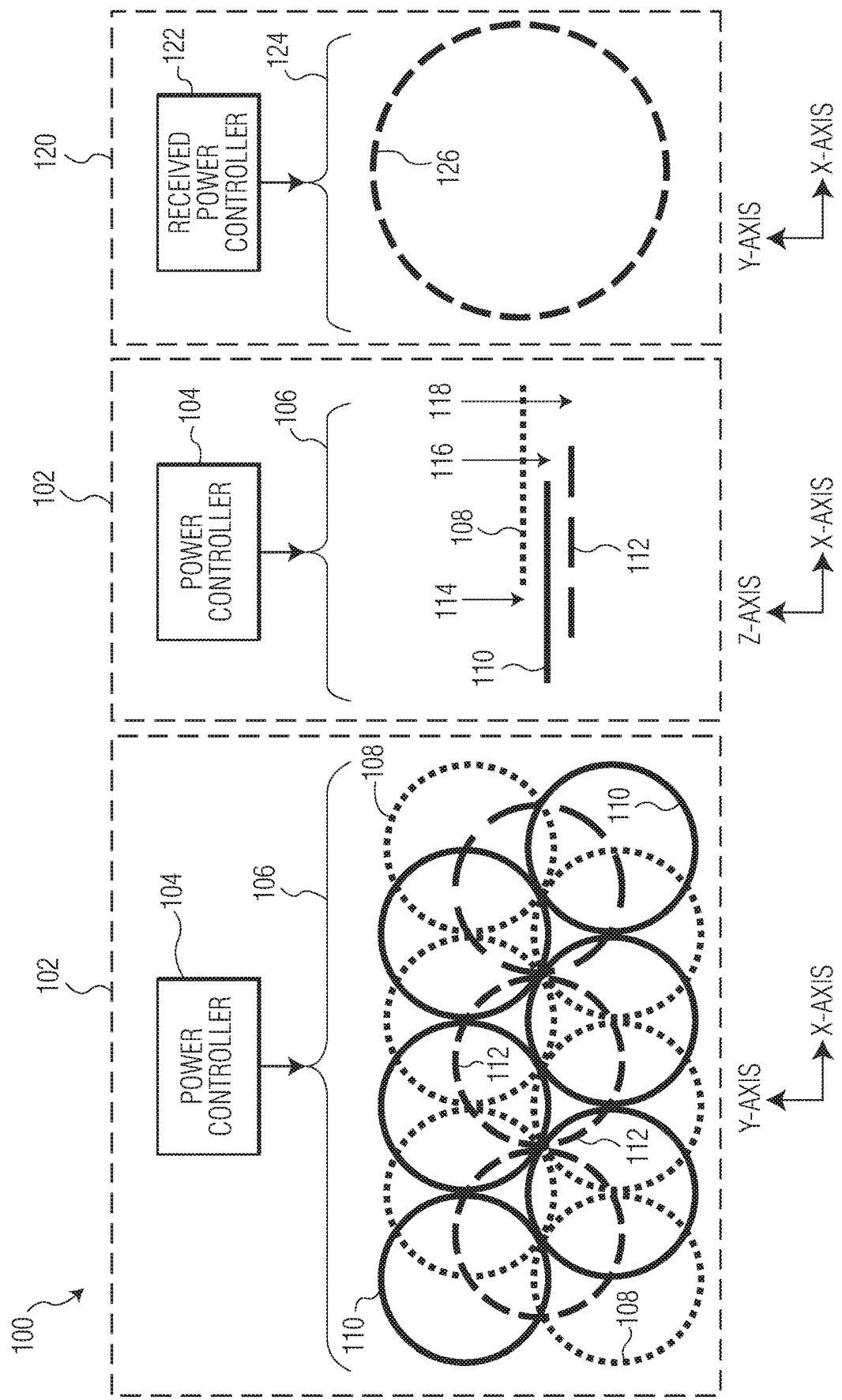

INDUCTIVE POWER TRANSFER DEVICE

The present specification relates to systems, methods, apparatuses, devices, articles of manufacture and instructions for an inductive power transfer device.

SUMMARY

According to an example embodiment, an inductive power transmit device, comprising: a power controller configured to be coupled to a set of primary inductive coils; wherein the power controller is configured to supply power to a first subset of the primary coils; wherein the first subset of primary coils are configured to inductively transfer power to a set of secondary inductive coils; wherein the power controller is configured to supply the power to a second subset of the primary coils in response to a threshold movement of the secondary inductive coils with respect to the primary inductive coils; and wherein the power controller is configured to determine the movement based on the power supplied to the first subset of primary coils, and a ratio of power supplied to one primary coil in the first subset of primary coils as compared to power supplied to all primary coils in the first subset of primary coils.

In another example embodiment, the power controller is configured to determine a distance that the secondary coil moved with respect to the first subset of primary coils based on a total of the power supplied to the first subset of primary coils.

In another example embodiment, the power controller is configured to equate an increase in the total power supplied to the first subset of primary coils with movement of the secondary coil closer to the first subset of primary coils; and the power controller is configured to equate a decrease in the total power supplied to the first subset of primary coils with movement of the secondary coil away from the first subset of primary coils.

In another example embodiment, the power controller is configured to supply the power to the first subset of primary coils if the distance from the secondary coil to the first subset of primary coils is less than a threshold distance; and the power controller is configured to supply the power to the second subset of primary coils if the distance from the secondary coil to the first subset of primary coils is greater than the threshold distance.

In another example embodiment, the power controller is configured to determine a rotation of the secondary coil about the first subset of primary coils based on the ratio of power supplied to one primary coil in the first subset of primary coils as compared to power supplied to all primary coils in the first subset of primary coils.

In another example embodiment, the power controller is configured to supply the power to the first subset of primary coils if the rotation from the secondary coil to the first subset of primary coils is less than a threshold rotation; and the power controller is configured to supply the power to the second subset of primary coils if the rotation from the secondary coil to the first subset of primary coils is greater than the threshold rotation.

In another example embodiment, the power controller is configured to detect the movement based additionally on a self-inductance of the secondary coil.

In another example embodiment, the power controller is configured to determine a distance between the primary coils and the secondary coil based on the self-inductance of the secondary coil.

In another example embodiment, the primary coils are coupled to a ferrite sheet.

In another example embodiment, the power supplied to the subsets of primary coils is constant.

In another example embodiment, the power supplied to either the first subset of primary coils or the second subset of primary coils is a same amount.

In another example embodiment, if the power controller is configured to supply power to the first subset of primary coils, then the power controller is configured to not supply power to any of the primary coils that are not part of the first subset of primary coils.

In another example embodiment, the power controller is coupled to the set of primary coils with a power distribution matrix.

In another example embodiment, the first and second subsets of primary coils includes at least three primary coils.

In another example embodiment, the primary coils are embedded in a holding surface; and the secondary coils are embedded in a mobile device configured to be placed on the holding surface.

In another example embodiment, the primary coils are embedded in a wireless inductive charging pad.

In another example embodiment, if the power controller is configured to supply power to the first subset of primary coils, then the power controller is configured to not supply power to any other inductive coils in the inductive charging pad that are not part of the first subset of primary coils.

In another example embodiment, each coil in the set of primary transmit coils is substantially a same size; and the set of primary transmit coils are symmetrically distributed throughout the inductive charging pad.

In another example embodiment, the power controller is configured to supply short bursts of power to various subsets of the primary coils; and the power controller is configured to determine a location of the secondary inductive coils based on a total power supplied to each of the various subsets of primary coils, and a ratio of power supplied to one primary coil in each of the various subsets as compared to power supplied to all primary coils in the each of the various sub sets.

According to an example embodiment, a method for enabling an inductive power transfer device to be operated, wherein the device includes a power controller configured to be coupled to a set of primary inductive coils, and wherein the primary coils are configured to inductively transfer power to a set of secondary inductive coils, the method comprising: distributing a set of instructions, stored on a non-transitory, tangible computer readable storage medium; wherein the instructions include: configuring the power controller to supply a power to a first subset of the primary coils; configuring the power controller to supply the power to a second subset of the primary coils in response to a threshold movement of the secondary inductive coils with respect to the primary inductive coils; and configuring the power controller to determine the movement based on the power supplied to the first subset of primary coils, and a ratio of power supplied to one primary coil in the first subset of primary coils as compared to power supplied to all primary coils in the first subset of primary coils.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 1A is an example and first view of an inductive power transmit device.

FIG. 1B is a second view of the inductive power transmit device.

FIG. 1C is a view of an inductive power receiving device.

Figure 2A:
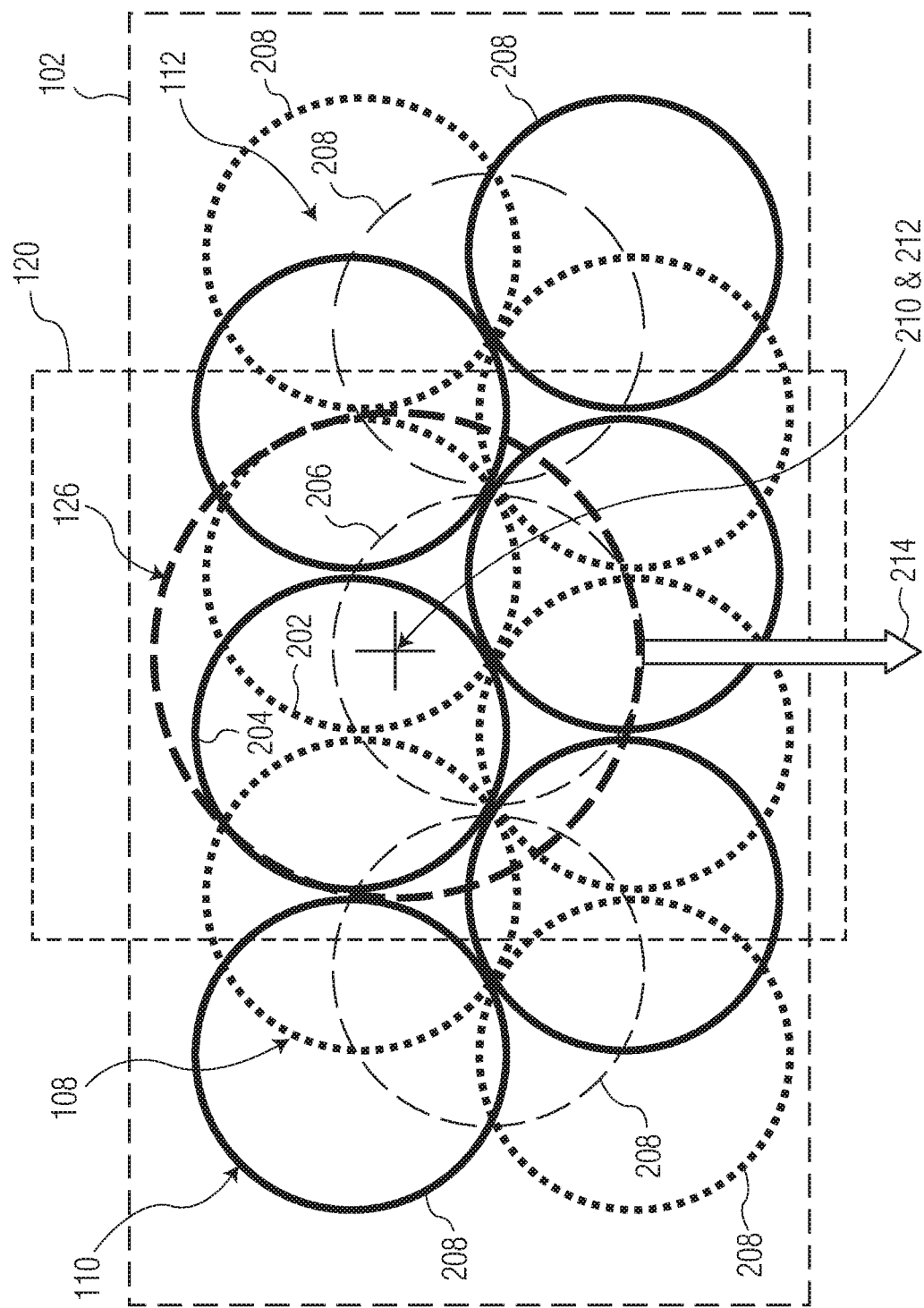
FIG. 2A is a first example of the inductive power receiving device moving with respect to the inductive power transmit device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless charging, while providing a cordless solution to powering and/or recharging devices, nevertheless can be quite inefficient if a device to be charged is not properly positioned over a wireless inductive charging pad or is moved during the inductive charging process. Primary transmit coils in the charging pad and secondary receive coils in the device to be charged can be misaligned and/or power charging is interrupted when the device to be charged is moved for various reasons. As a result, power transfer efficiency decreases and power consumption by the charging device increases.

Now discussed are example devices for run-time monitoring of movements between a primary set of power transmit coils in a charging device and a secondary set of power receive coils in a device to be charged as part of a multi-coil wireless power system.

The device constantly monitors a position of the secondary set of power receive coils and reroutes power between a first subset of the primary coils to a second subset of the primary coils to continue transmitting power to the secondary set of power receive coils. In some example multi-coil wireless power systems, this is called Receiver Position Estimation (RPE).

To track movement of the secondary set of power receive coils, the device monitors attributes of the first subset of primary coils currently transferring power, and when these attributes exceed one or more predetermined thresholds, switches power to the second subset of primary coils.

The attributes monitored include: changes in an inductance of the secondary coils to determine a vertical z-axis (Z) gap between the primary and secondary coils; changes in a total power supplied to the first subset of primary coils to determine a distance (i.e. radius) that the primary and secondary coils move with respect to each other; and changes in a ratio of power supplied to one primary coil in the first subset of primary coils as compared to power supplied to all primary coils to determine an angle of such movement.

By realigning the primary coils actively supplying power to the secondary coils, the device can seamlessly (i.e. without power interruption) maintain efficient and optimal power transfer from the primary transmit coils to the secondary receive coils.

In some example embodiments the primary coils are embedded in a holding device (e.g. an inductive charging pad) and the secondary coils are embedded in a mobile device (e.g. earbuds, smartphone, etc.) having a battery to be wirelessly/inductively charged.

The device examples discussed below provide a higher accuracy for when to switch between first and second sets of primary coils, resulting in a higher power transfer efficiency by reducing misalignment between the power transmit and power receive coils. These example devices also avoid supplying power to primary coils that could not efficiently transfer inductive power to the secondary receiving coil.

Because not all of a charging device's primary coils are activated, EMI emissions are also lower.

FIG. 1A is an example and first view of an inductive power transmit device 102. The example 100 includes an inductive power transmit device 102 coupled to a power source (not shown). The inductive power transmit device 102 includes a power controller 104 (e.g. voltage and/or current controller), a power distribution matrix 106 (simplified), a first set of primary coils 108 including six independently powered coils, a second set of primary coils 110 including six independently powered coils, and a third set of primary coils 112 including three independently powered coils.

FIG. 1B is a second view of the inductive power transmit device 102. The second view shows the inductive power transmit device 102 from a side and includes a top layer 114 including the first set of primary coils 108, a middle layer 116 including the second set of primary coils 110, a lower layer 118 including the third set of primary coils 112, a ferrite sheet (not shown), and a holding surface (not shown). The primary coils 108, 110, 112 are embedded in the holding surface which can host various devices to be charged (e.g. earbuds, smartphone, etc.)

FIG. 1C is a view of an inductive power receiving device 120. The inductive power receiving device 120 is configured to be coupled to a power receiving device (not shown) such as a battery. The inductive power receiving device 120 includes a received power controller 122, a power receive matrix 124 (simplified), and a secondary receiving coil 126. In other example embodiments the inductive power receiving device 120 includes several secondary receiving coils.

In some example embodiments the primary transmit coils 108, 110, 112 have a 45 mm diameter and the secondary receive coil 126 has a 70 mm diameter.

FIG. 2A is a first example of the inductive power receiving device 120 moving with respect to the inductive power transmit device 102. In this first example 200 the power controller 104 has activated (i.e. supplied power to) primary coils 202, 204, 206. Coil 202 is from the first set of primary coils 108, coil 204 is from the second set of primary coils 110, and coil 206 is from the third set of primary coils 112. The power controller 104 has deactivated (i.e. blocked power to) inactive coils 208 from the various sets of coils 108, 110, 112.

A center point 210 of the three active primary coils 202, 204, 206 in the inductive power receive device 120 is in this example 200 at a time t0 overlapped by a center point 212 of the secondary coil 126. However these two center points 210, 212 will no longer overlap at a time t1 due to a direction of movement 214 of the secondary coil 126 with respect to the primary coils 202, 204, 206.

Figure 2B:
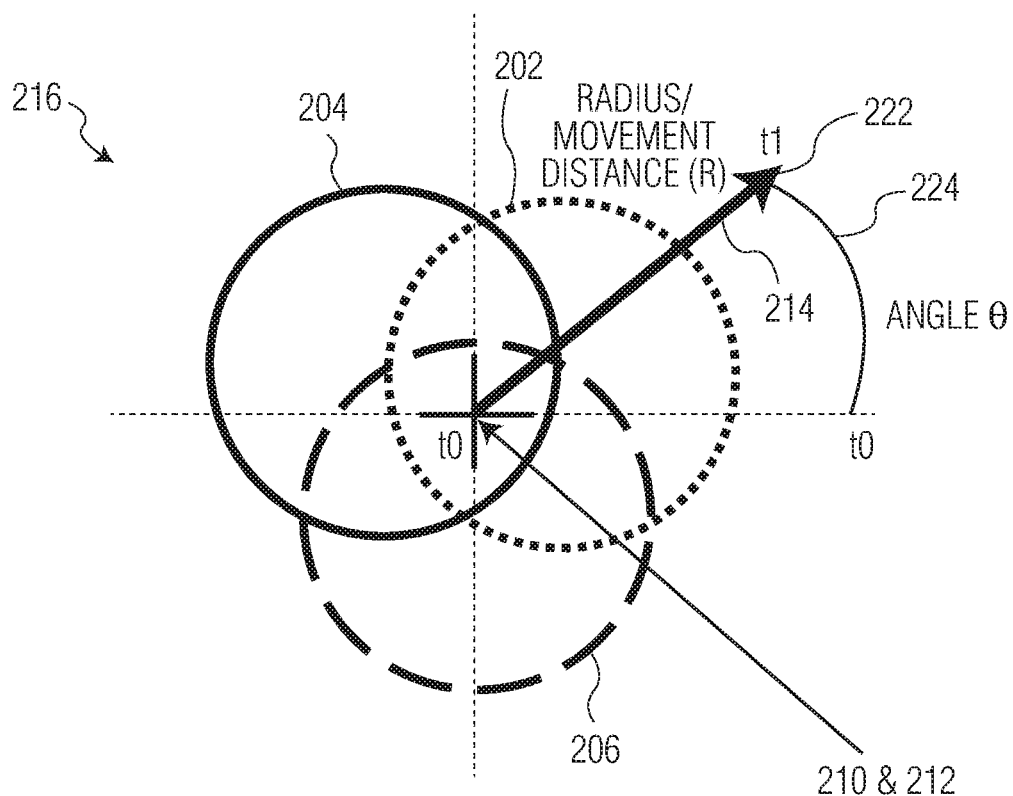
FIG. 2B is a second example of the inductive power receiving device moving with respect to the inductive power transmit device.
Figure 2C:
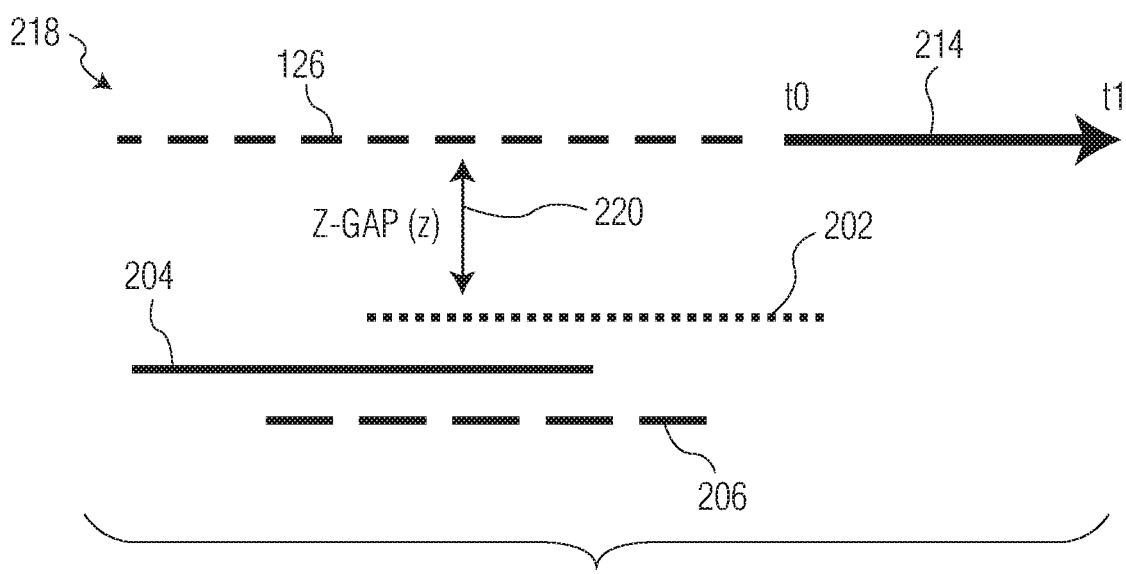
FIG. 2C is a third example of the inductive power receiving device moving with respect to the inductive power transmit device.

FIG. 2B is a second example 216 of the inductive power receiving device 120 moving with respect to the inductive power transmit device 102. FIG. 2C is a third example 218 (i.e. side view) of the inductive power receiving device 120 moving with respect to the inductive power transmit device 102.

In these examples 216, 218, the active primary coils 202, 204, 206 and the secondary receiving coil 126 are shown separated by a z-axis gap (Z-gap) 220 (e.g. distance between primary and secondary coil planes). The center points 210, 212 overlap at a time t0, but after a direction of movement 214 at time t1 the center points 210, 212 will be offset by a radius (R) 222 (e.g. distance of movement). An angle (θ) 224 with respect to a predefined x-y axis after the movement 214 is also shown.

Figure 3:
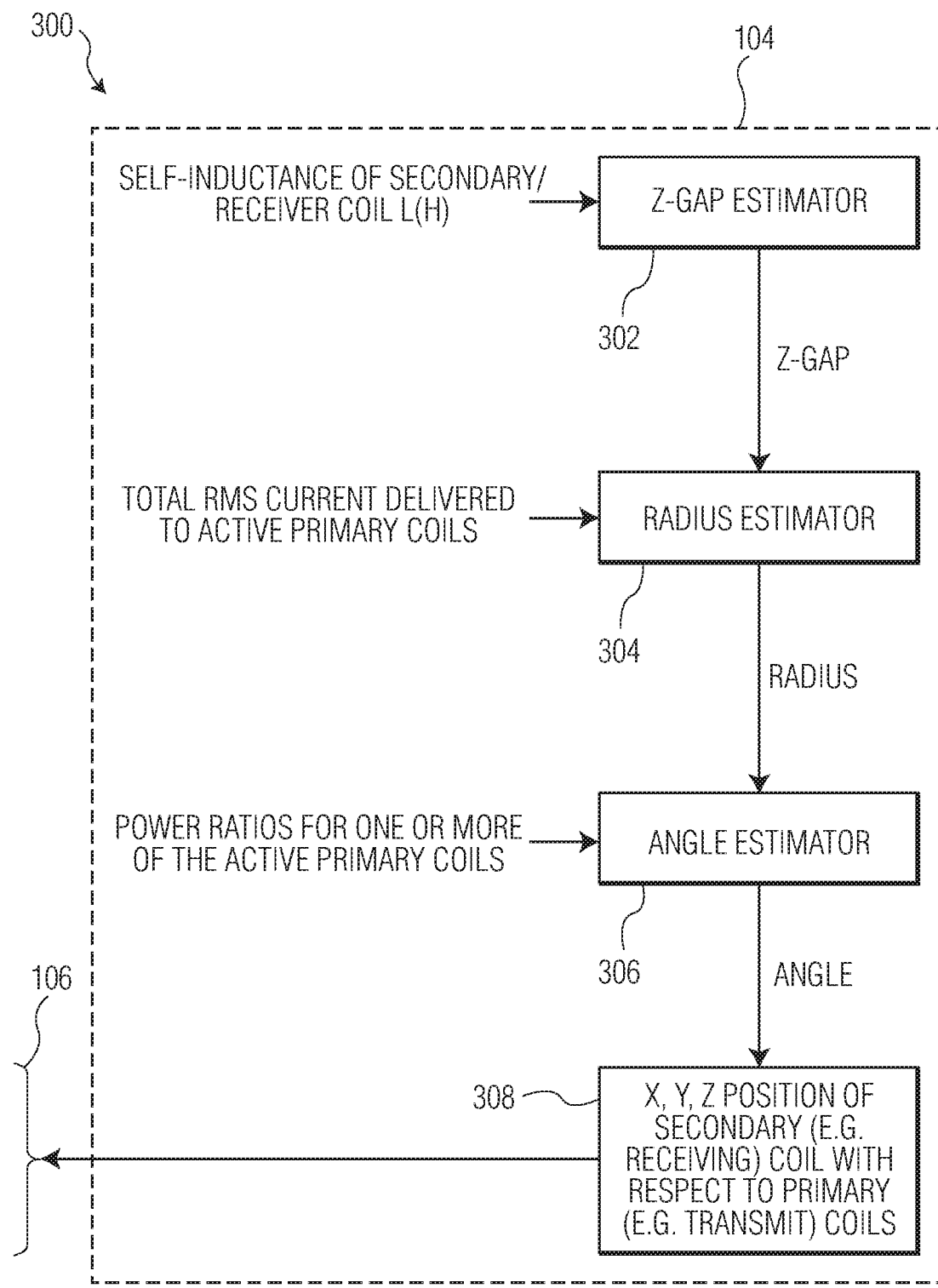
FIG. 3 is an example power controller within the inductive power transmit device.

FIG. 3 is an example 300 power controller 104 within the inductive power transmit device 102. The power controller 104 includes a Z-gap estimator 302, a radius estimator 304, and an angle estimator 306 which together determine the Z-gap 220, the radius 222, and the angle 224 in response to the movement 214. An x, y, z position estimator 308 then determines the position of the inductive power receiving device's 120 secondary receiving coil 126 with respect to the active primary coils 202, 204, 206 on the inductive power transmit device's 102 holding surface using the Z-gap 220, radius 222, and angle 224 information.

To maintain power transfer efficiency, the power controller 104 switches from a first subset of active primary coils to activate a second subset of primary coils in response to various threshold variations in the Z-gap 220, radius/distance 222, and angle 224. An overall efficiency of the inductive power transfer can be calculated as equal to the receiving device's 120 output power divided by the transmit device's 102 input power.

In some example embodiments, a threshold for switching to a next set of transmit coils can be set if the radius/distance 222 of movement (i.e. t0 to t1 change in distance) is at least ⅓ the diameter of a symmetrical set of any one of the active primary transmit coils.

In some example embodiments, if the angle 224 of the receiving device's 120 movement exceeds a threshold of 60 degrees, the power controller 104 switches supplied power to a next set of primary/transmit coils 108, 110, 112 using the power distribution matrix 106.

In some example embodiments, if the Z-gap 220 exceeds a predetermined distance and/or range, the power controller 104 deactivates all the primary coils 108, 110, 112 presuming the power receiving device 120 is no longer in the holding surface. Such distance and/or range can be 5 to 10 mm below and above the coils 108, 110, 112.

Such threshold distances, angles, and Z-gaps 220 for activating and deactivating power transmit coils can be stored in look-up-table or calculated using a predetermined equation.

Z-Gap 220 Determination:

The power controller 104 determines the Z-gap 220 distance based on the self-inductance of the secondary receiving coil 126. The self-inductance in some example embodiments is calculated using a slotted quality factor measurement. Those skilled in the art will know of other self-inductance calculation algorithms. Once the self-inductance is known, the Z-gap 220 in some example embodiments is retrieved from a look-up-table based on prior empirical measurements.

Figure 4:
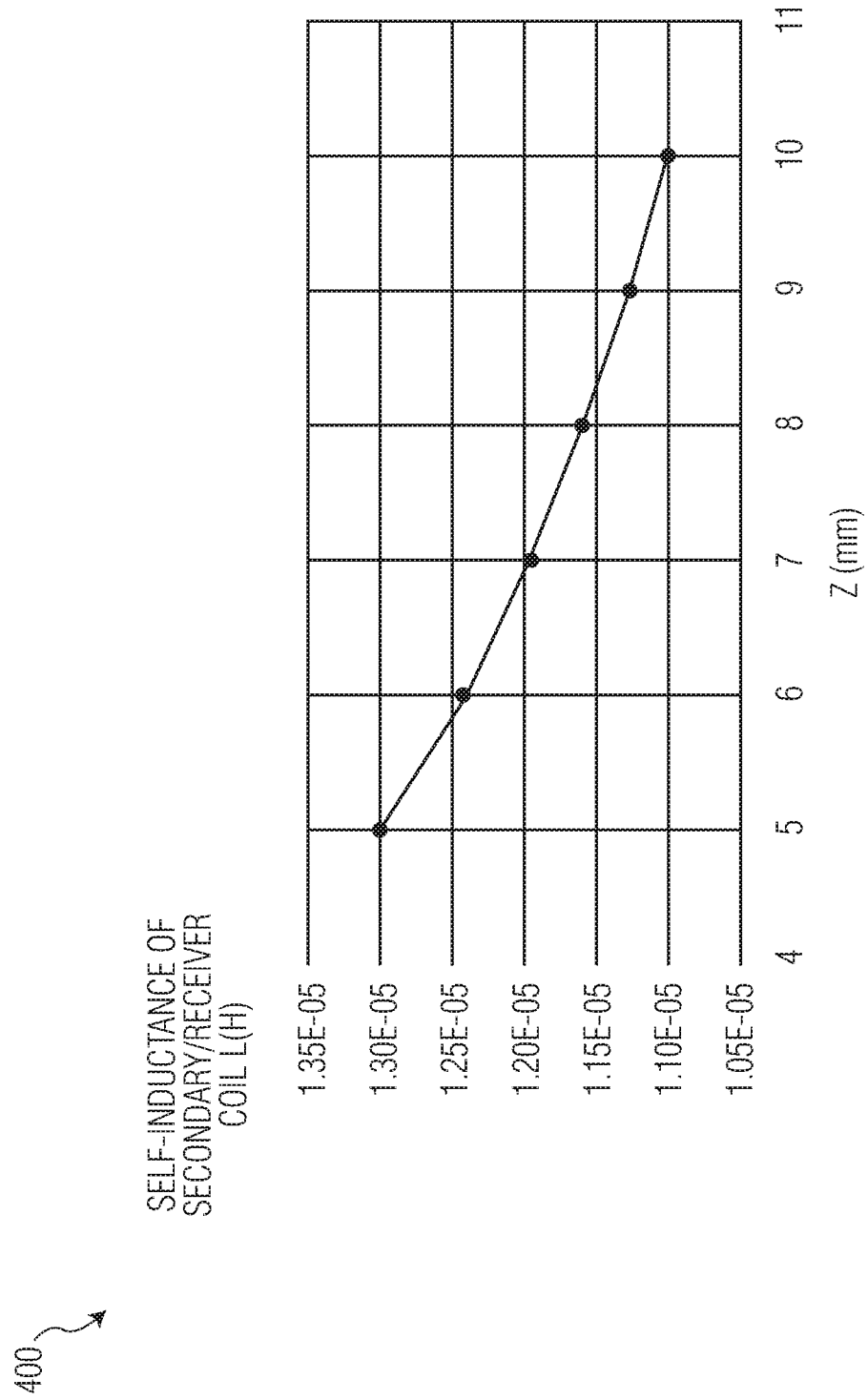
FIG. 4 is an example graph of a self-inductance of secondary receiving coil in the inductive power receiving device.

FIG. 4 is an example 400 empirical graph of a self-inductance of secondary receiving coil in the inductive power receiving device where a 13.0 μH self-inductance equates to a 5 mm Z-gap 220.

To improve measurement of the self-inductance of the secondary receiving coil 126 the transmit device 102 includes a ferrite sheet which in some example embodiments is underneath the lower layer 118. The self-inductance of the secondary receiving coil increases as the secondary receiving coil 126 moves closer to the ferrite sheet. The self-inductance of the secondary receiving coil 126 does not depend on the secondary receiving coil's 126 x-y coordinates with respect to the primary coils 108, 110, 112 if the ferrite sheet is sufficiently big.

Note that depending upon a topology (i.e. physical layout) of the receiving device 120, the Z-gap 220 can vary as the receiving device 120 is moved within the holding surface or when a new receiving device 120 (e.g. smartwatch, laptop, earbuds, etc.) is placed on the holding surface.

Radius/Distance of Movement 222 Determination:

A total power routed to the set of active primary coils 202, 204, 206 varies with both the Z-gap 220 and the radius/distance 222. However, for a given Z-gap 220, the total power remains substantially constant for a given radius/distance 222 regardless of an angle 224 of the secondary receiving coil 126 to the active primary coils 202, 204, 206. Thus the radius/distance 222 can be determined based on the Z-gap 220 and a total RMS current routed to the set of active primary coils 202, 204, 206.

Figure 5A:
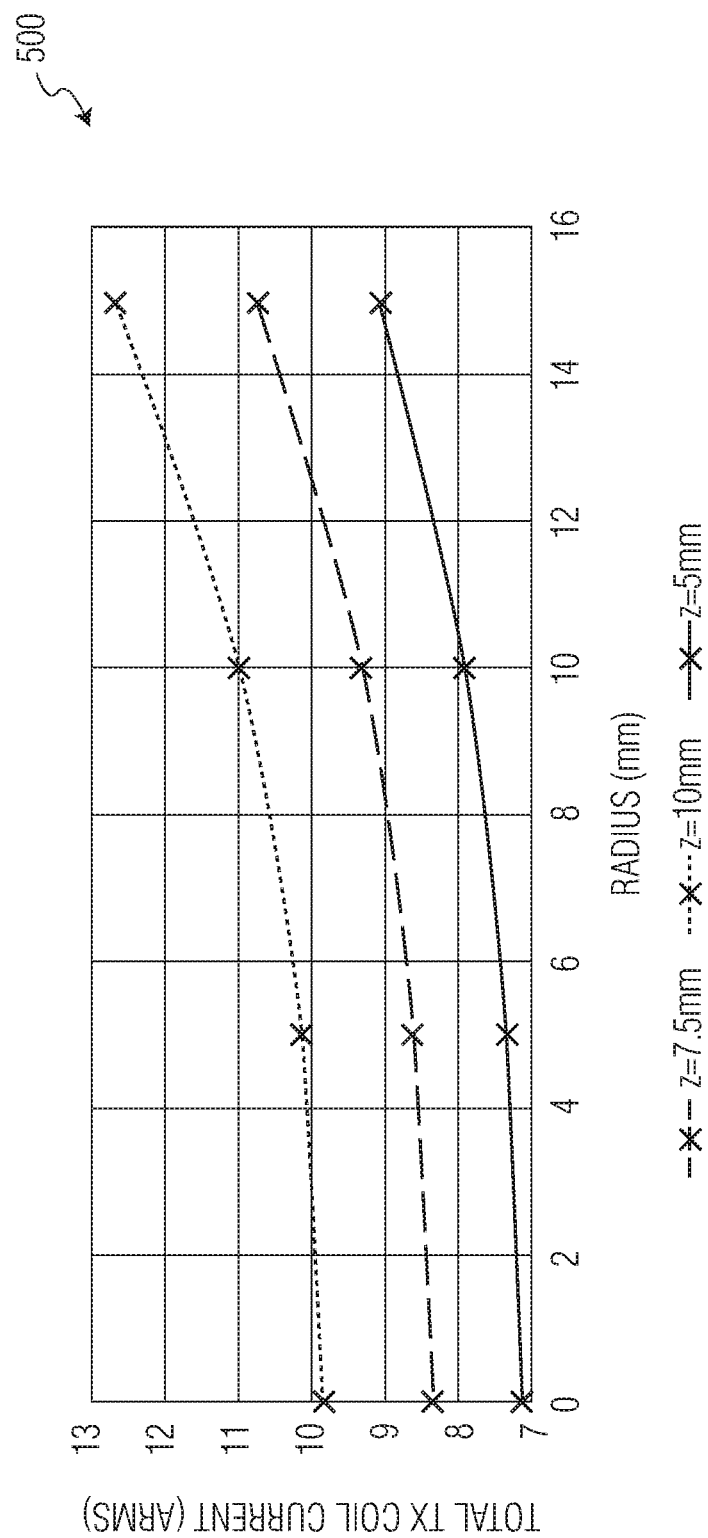
FIG. 5A is an example graph of a distance (e.g. radius) that the inductive power receiving device moved with respect to the inductive power transmit device based on a total power supplied to a set of primary transmit coils in the inductive power transmit device.

FIG. 5A is an example 500 graph of a distance (e.g. radius) 222 that the inductive power receiving device 120 moved with respect to the inductive power transmit device 102 based on a total power supplied to the set of primary transmit coils 202, 204, 206 in the inductive power transmit device 102. For example: if z=5 mm and the total active coil current=8 A, then FIG. 5A shows the radius/distance 222=10 mm.

Total RMS current is defined by the following equation, where "n" is the number of active primary coils 202, 204, 206:

$$I_{Total} = \Sigma_{k=1}^{n} I_{k(RMS)}$$

In some example embodiments, the radius/distance 222 is retrieved from a look-up-table based on prior empirical measurements for various Z-gaps 220 and total routed RMS currents such as shown in FIG. 5A. In other example embodiments, the radius/distance 222 can be calculated using a predetermined equation.

While ideally the total RMS current remains constant for all rotation angles, in some actual example embodiments due to variations in fabrication of the primary coils 202, 204, 206 and holding surface.

Figure 5B:
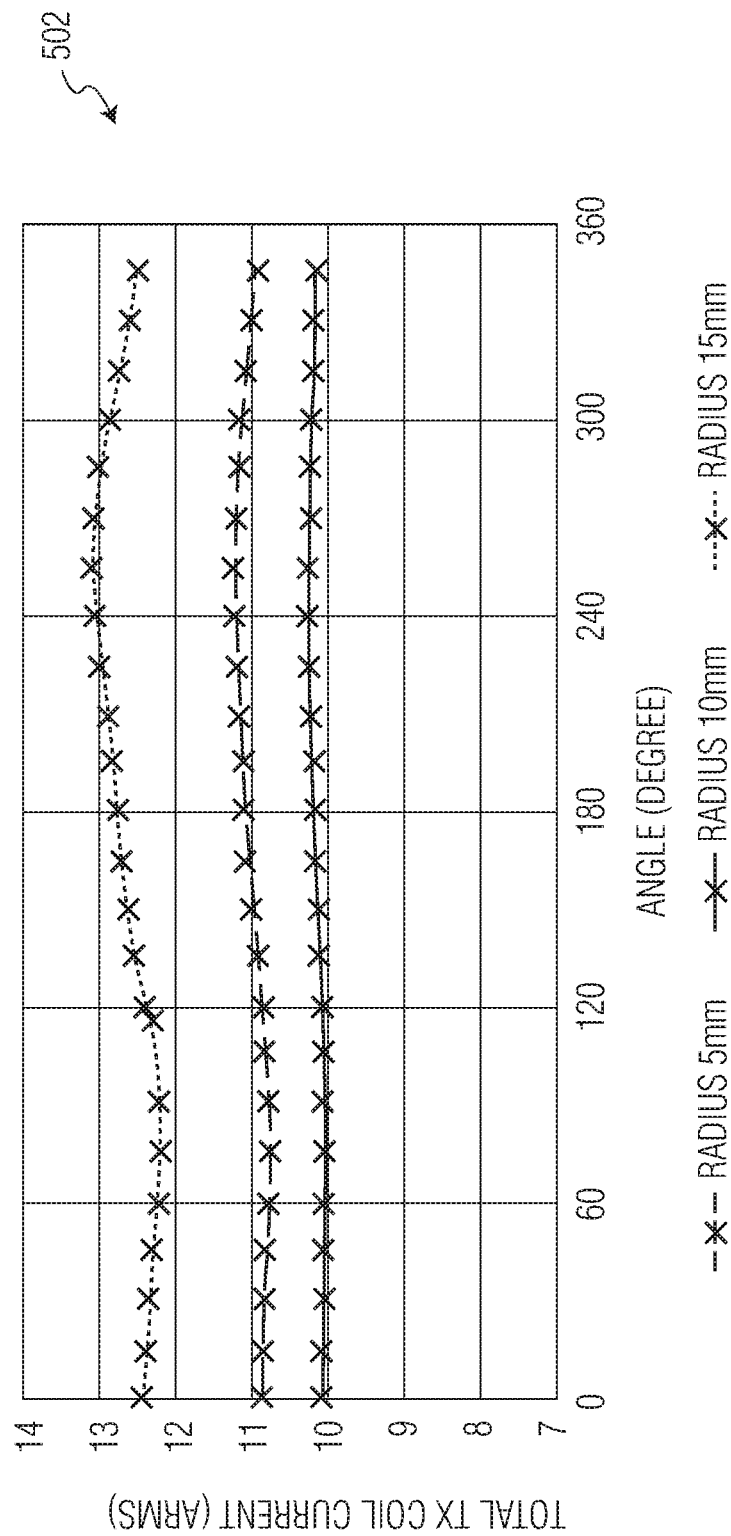
FIG. 5B is an example graph of variations in the total power supplied to the set of primary transmit coils in the inductive power transmit device as the inductive power receiving device changes angle with respect to the inductive power transmit device.

FIG. 5B is an example 502 graph of variations in the total power supplied to the set of primary transmit coils 202, 204, 206 in the inductive power transmit device 102 as the inductive power receiving device 120 changes angle 224 with respect to the inductive power transmit device 102. As shown in FIG. 5B, the total RMS current fluctuates as the angle 224 changes. Such fluctuations can be compensated for in the look-up-table.

Fluctuations can be also decreased or eliminated by coil design where height of coils (side view) will be much smaller than z-gap, and/or by coil design where inductances in each layer are different. For example a top coil could have 9 μH, a middle coil could have 8 μH, and a bottom coil could have 7 μH which will result in a same distribution of coil current per layer in some example embodiments.

The empirical data in FIG. 5B is for a Z-gap 220 of 10 mm.

Angle 224 Determination:

For angle 224 determination, the power controller 104 calculates a power balance ratio for each one of the active primary coils 202, 204, 206. The power balance ratio is defined according to the following equation:

$$P_{k_{Ratio}} = \frac{P_k}{\sum_{m=0}^{n} P_m}$$

where: Pk is an individual active coil's power output; and Pm summation is a total power output of all the active primary coils 202, 204, 206.

The power output contribution of an individual active primary coil, as compared to the total power output of all the active primary coils 202, 204, 206, varies with the angle 224. Geometrically this power contribution variation is correlated to the center point of secondary coil 212 orbiting the center point of active primary coils 210 (see. FIGS. 2A and 2B).

FIGS. 6A, 6B, 6C, 6D, 6E and 6F are example 600, 602, 604, 606, 608, 610 graphs of variations in a power balance ratio as the inductive power receiving device 120 changes angle 224 with respect to (i.e. orbits) the inductive power transmit device 102. As shown by these Figures, the Pk_Ratio has a sinusoidal characteristic for a given radius 222 and Z-gap 220.

An exact shape of the power balance ratio vs. angle 224 variation is dependent on a number and topology of the active primary coils 202, 204, 206.

The secondary receiving coil's 126 angle 224 of movement from time t0 to t1 can thus be derived from an amplitude (A) (see. FIG. 6D) of the power balance ratio of at least two of the active primary coils 202, 204, 206. The relation between the angle 224 and the amplitude can also be derived from a look-up-table and/or a predetermined equation.

Figure 6A:
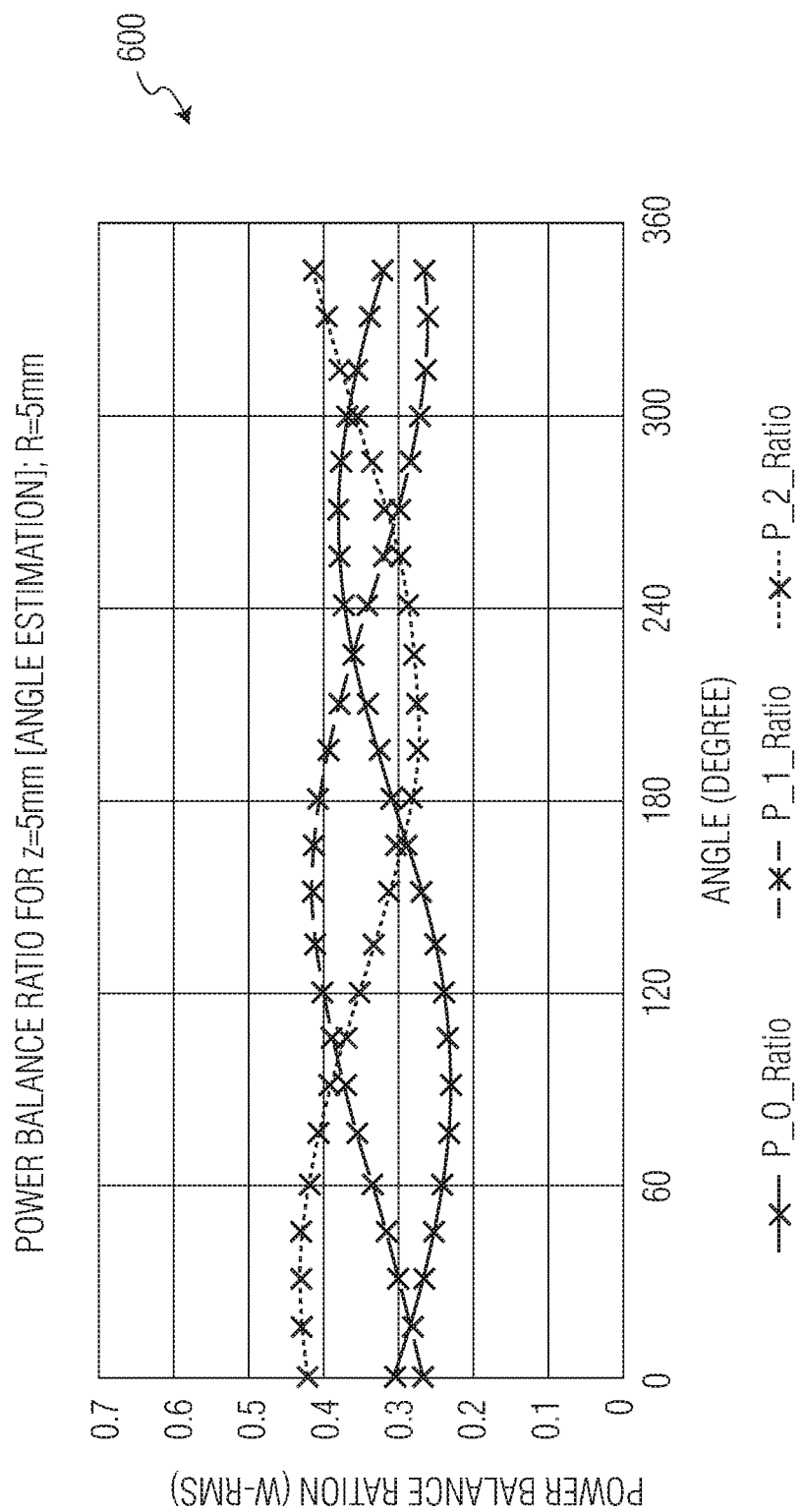
FIGS. 6A, 6B, 6C, 6D, 6E and 6F are example graphs of variations in a power balance ratio as the inductive power receiving device changes angle with respect to the inductive power transmit device.
Figure 6B:
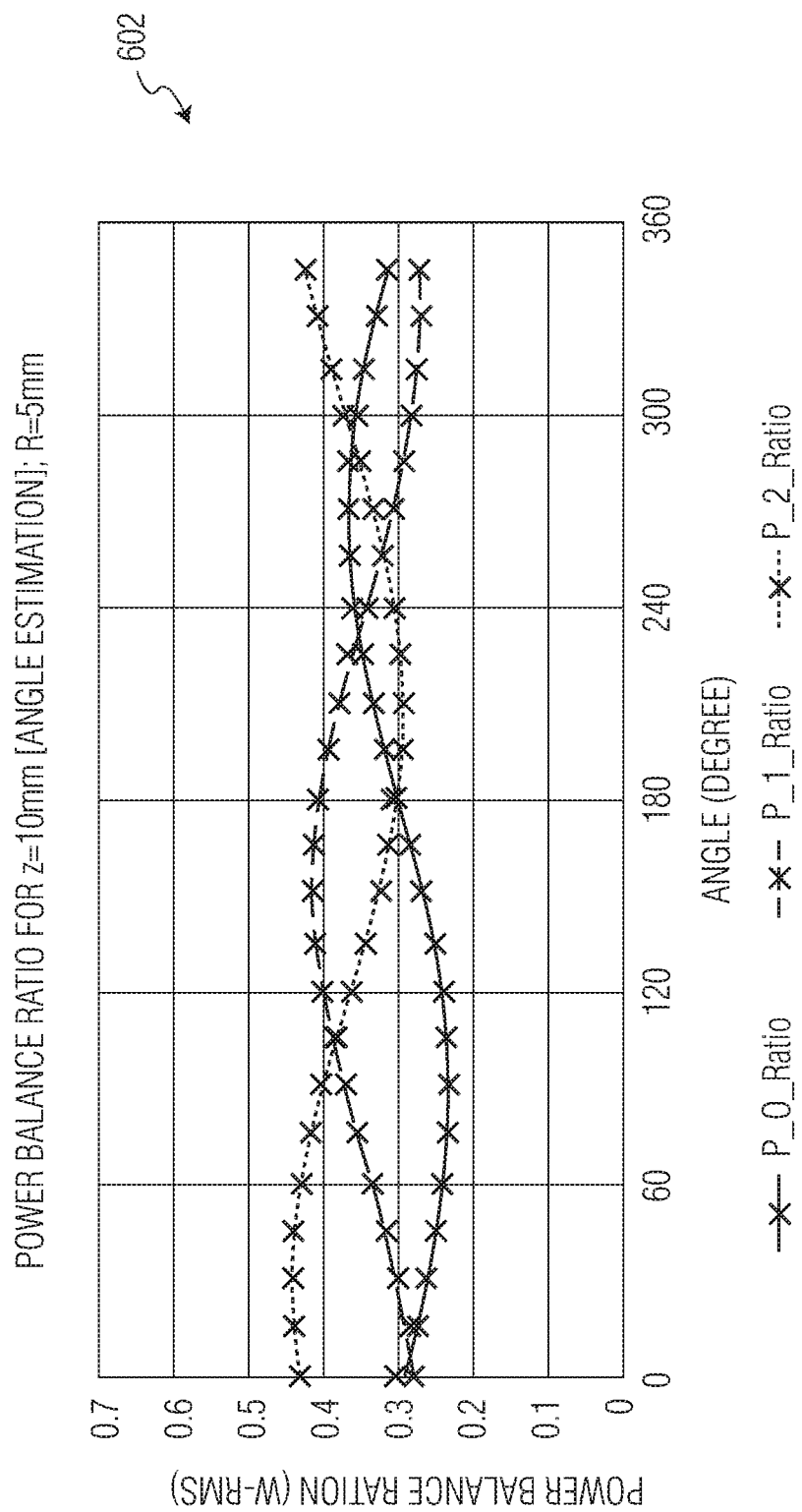
Figure 6C:
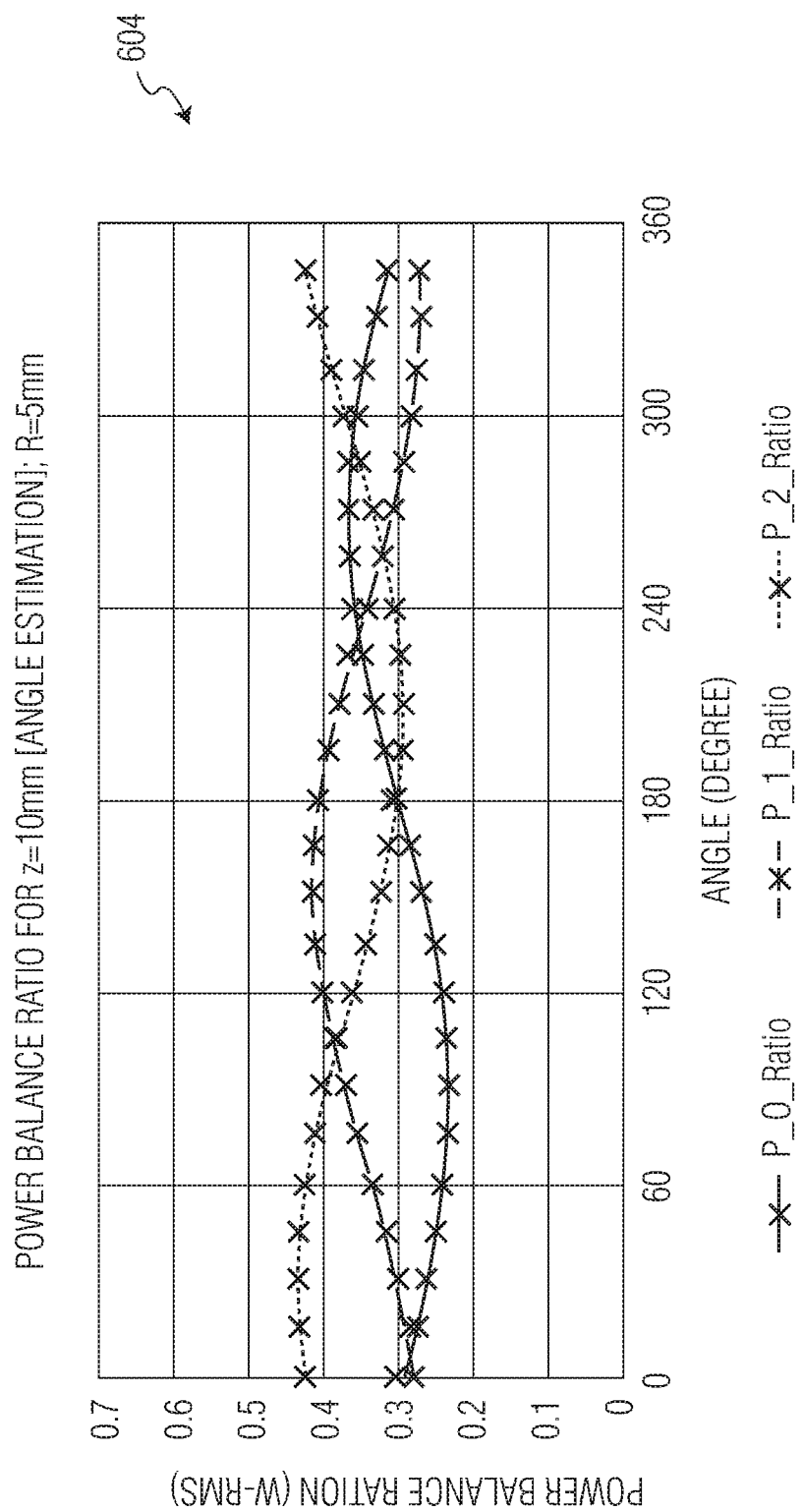
Figure 6D:
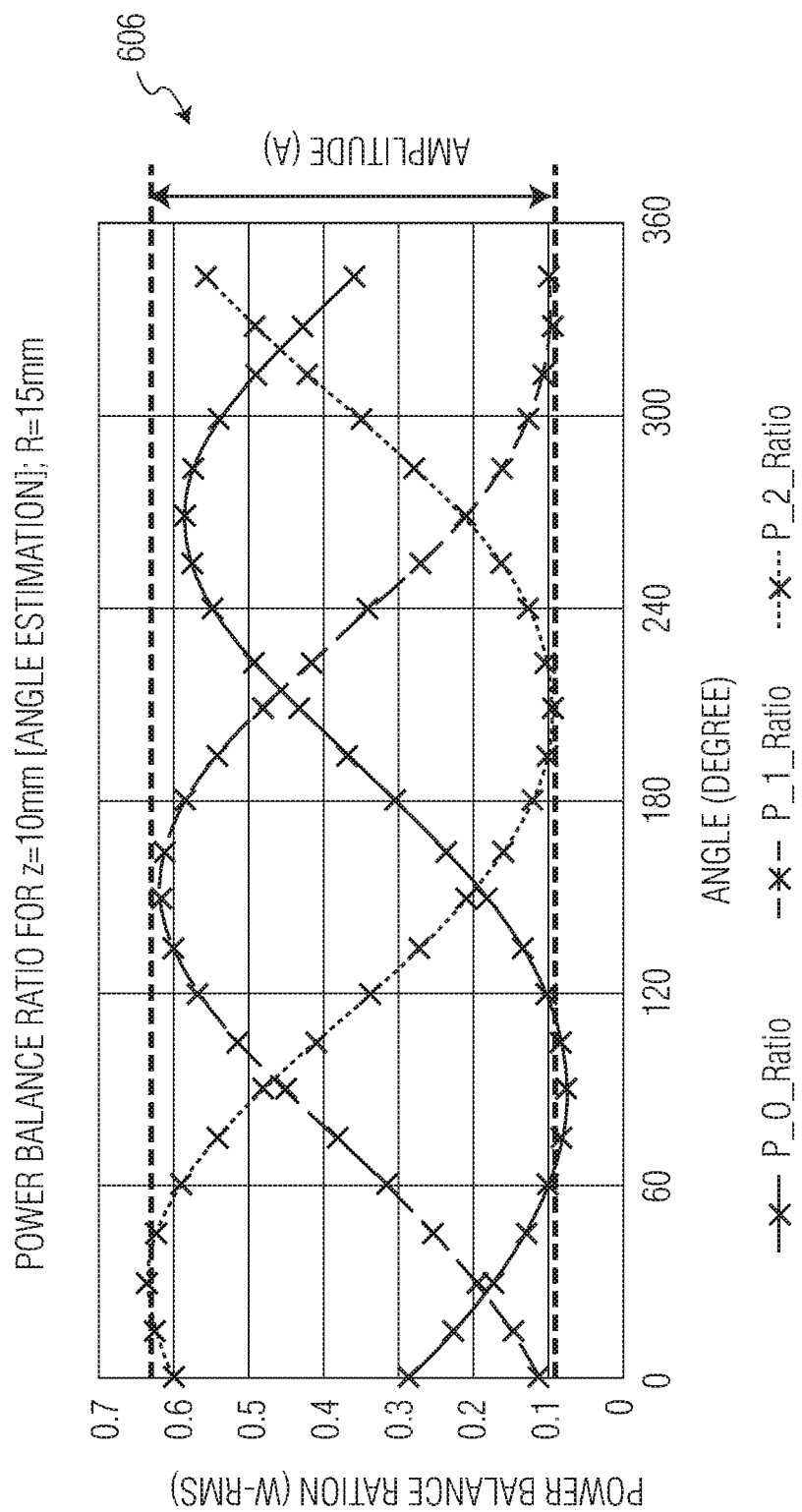

Note that in the example embodiments shown, the power output contribution of an individual active coil does not vary with the Z-gap 220 as shown in FIG. 6A, where Z-gap=5 mm and FIG. 6B, where Z-gap=10 mm and, but does vary with the radius/distance 222 as shown in FIG. 6C, where radius=5 mm and FIG. 6D, where radius=15 mm.

Figure 6E:
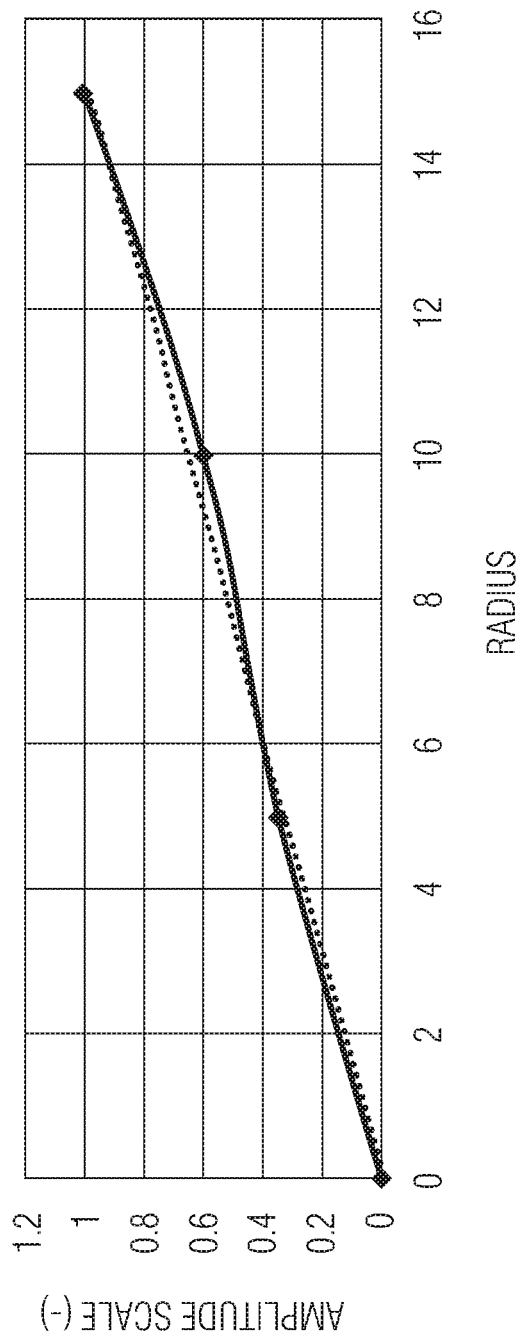

FIG. 6E shows an alternate graph for displaying the amplitude (A) of the power balance ratio amplitude vs radius is this particular example embodiment. Thus for a known Z-gap 220, radius 222 and power balance ratio amplitude, the angle 224 can be determined and all the information to calculate x, y, z position of the power receiving device 120 can be determined.

Figure 6F:
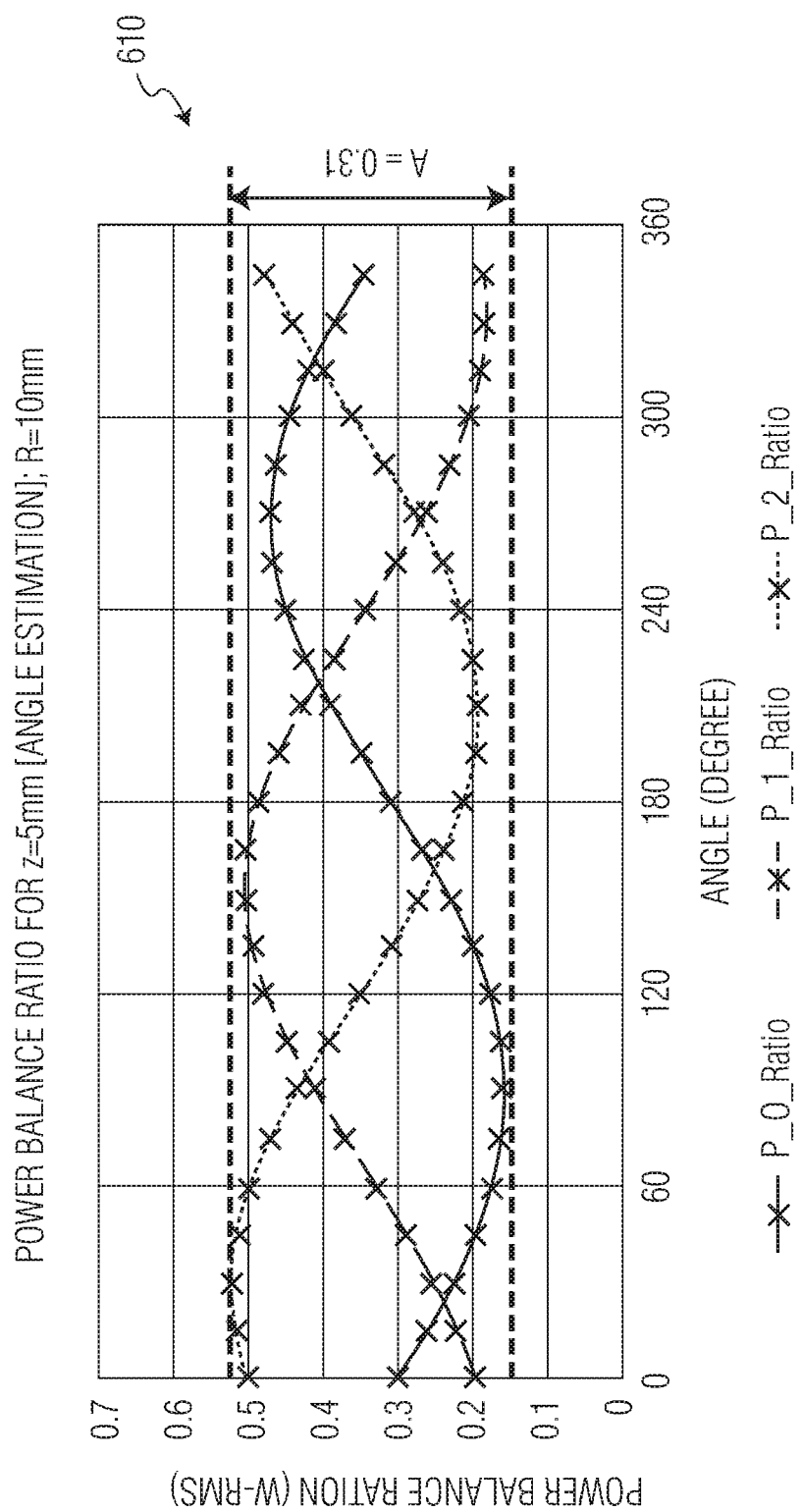

FIG. 6F shows a particular example where the Z-gap=5 mm, the radius/distance 222=10 mm, power to each of the primary coils is P_coil 202=16 W, P_coil 204=42 W, and P_coil 206=42 W, the respective power balance ratios are: P_1=0.42; P_2=0.42; P_3=0.16, and the power balance ratio amplitude (A)=0.31. An angle 224 corresponding to these values is about 95 degrees.

Thus by monitoring the self-inductance of the secondary receiving coil 126, the total RMS current delivered to various subsets of the primary coils 108, 110, 112, and a ratio of a power transmitted to each active coil with respect to all active coils in the primary coils 108, 110, 112, the power controller 104 can determine where the receiving device 120 moves with respect to the transmit device 102 from time t0 to time t1.

In some example embodiments, where the Z-gap 220 is substantially known, a separate Z-gap 220 determination is not required in order to determine the radius/distance 222 and angle 224 as described above. Also, the inductance, current and power determinations described above are in some example embodiments independent of the secondary receiver coil's 126 output power.

Since the power controller 104 monitors movements of the secondary receiving coil 126 by monitoring the currents and power sent to each of the active primary coils and switches current to the primary coils 108, 110, 112 so as to maintain a constant input power to the transmit device 102, power transfer to the receiving device 120 is not interrupted (e.g. run-time coil switching).

Also since the Z-gap 220, radius/distance 222 and angle 224 determinations can be made while the inductive power transmit device 102 is operating, there is no need to create "time slots" that interrupt wireless inductive charging to the secondary receive coil.

In some example embodiments, the Z-gap 220, radius/distance 222 and angle 224 determinations can be made before wireless inductive charging to the secondary receive coil even begins. In such example embodiments, short bursts of power to various subsets of the primary coils are used to perform an initial search for the secondary receive coil 126 located somewhere on the holding surface. Such short power bursts could also form part of a standby mode for the inductive power transmit device 102 when no secondary receive coil 126 is present. The short power bursts allow radius/distance 222 and angle 224 to be determined using the same principles discussed above.

In other example embodiments, the short power bursts to the various subsets of the primary coils are used to detect additional secondary receive coils for when multiple mobile devices are located within the holding surface.

Figure 7:
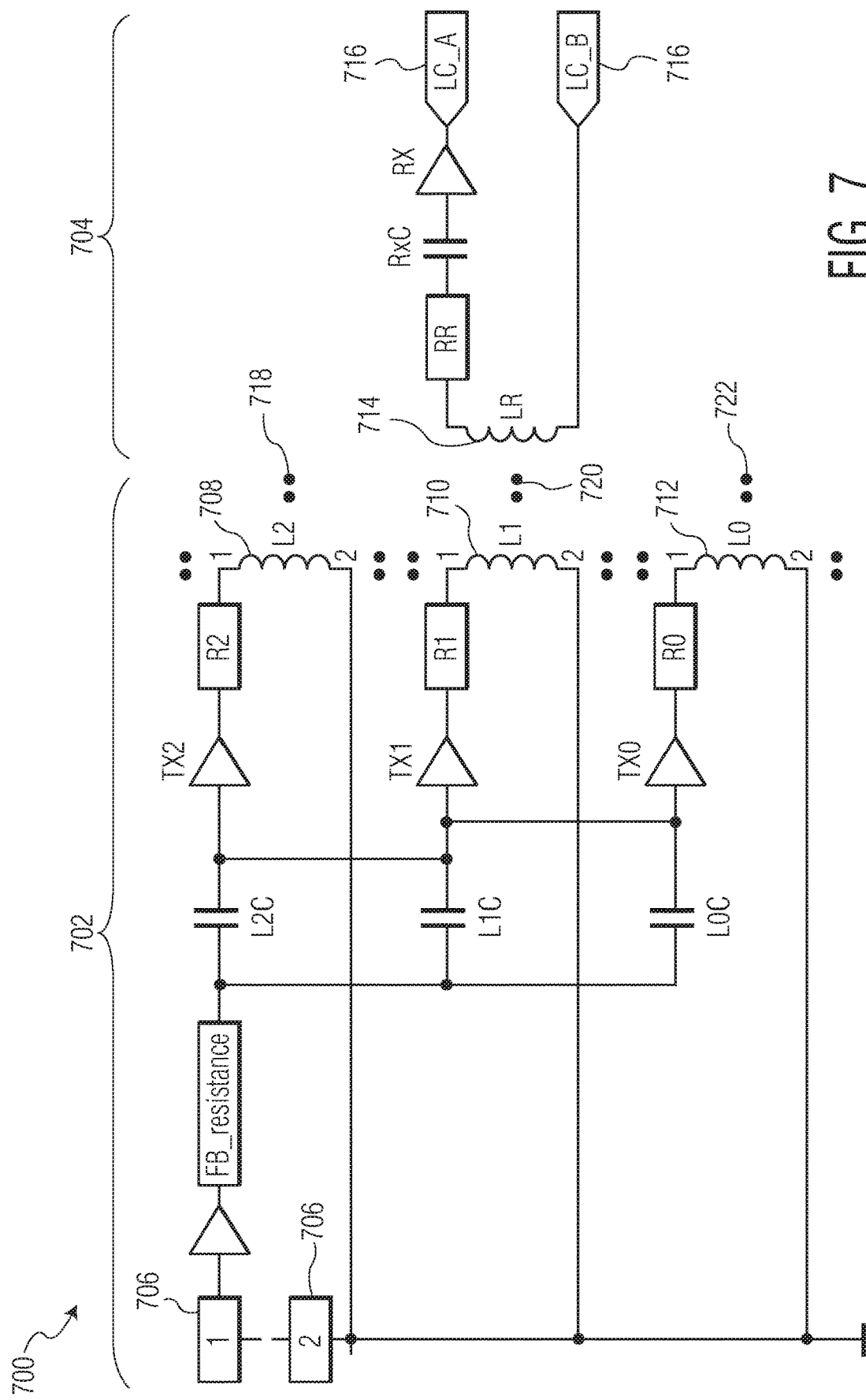
FIG. 7 includes example idealized circuits for the inductive power transmit device and the inductive power receiving device.

FIG. 7 includes example 700 idealized circuits for the inductive power transmit device 702 and the inductive power receiving device 704. The inductive power transmit device 702 includes power input ports 706 from a power source (not shown) and active primary coils 708, 710, 712. The inductive power receive device 704 includes a secondary receive coil 714 and power output ports 716 to a power receiving device (not shown) such as a battery. The active primary coils 708, 710, 712 transfer power to the secondary receive coil 714 based on coupling coefficients 718, 720, 722.

The power controller 104 monitors the three powers (i.e. TX0, TX1, TX2) routed to each of the active primary 708, 710, 712 which can be operating close to resonant frequency. The three powers are dependent on the coupling coefficients 718, 720, 722. The coupling coefficients 718, 720, 722 change as the Z-gap 220, radius 222, and angle 224 change in response to the receiving device's 704 movement with respect to the transmit device 702 from a time t0 to a time t1.

Without power rerouting by the power controller 104 when comparing two positions for two different primary coils sets, the receiving device's 704 output voltage at ports 716 would vary with a position of the secondary receive coil 714 with respect to the primary coils 708, 710, 712. Voltage would not vary much for small movements within one primary coils set.

However, by rerouting power from ports 706 to a next set of active primary coils (not shown) as the receiving device 704 moves, the receiving device's 704 output voltage remains substantially constant as does the transmit device's 702 input power.

In some example embodiments, the transmit device's 702 output power is regulated by amplitude of 50% duty cycle square signal from the power input ports 706. Power can also be regulated by phase (duty/cycle).

The various example embodiments of the inductive power transmit device 102 enable Receiver Position Estimation (RPE) for Multi-coil Inductive Wireless Power Transfer devices such as the inductive power receiving device 120.

These applications include inductive power receiving devices such as laptop computers, tablets, smartphones, input devices (e.g. e-pen, mouse, etc.), earbuds, automotive battery charging (e.g. parking lots, roadways, etc.), as well as devices which require wireless power transfer and large movement freedom with no power interruption (e.g. automated warehouse carts, industrial equipment, robots, etc.).

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. An inductive power transmit device, comprising:
a power controller configured to be coupled to a set of primary inductive coils;
wherein the power controller is configured to supply power to a first subset of the primary coils;
wherein the first subset of primary coils are configured to inductively transfer power to a set of secondary inductive coils;
wherein the power controller is configured to supply the power to a second subset of the primary coils in response to a threshold angular movement of the secondary inductive coils with respect to the primary inductive coils; and
wherein the power controller is configured to determine the angular movement based on the power supplied to the first subset of primary coils, and a ratio of power supplied to one primary coil in the first subset of primary coils divided by a power supplied to all primary coils in the first subset of primary coils.

2. The device of claim 1:
wherein the power controller is configured to determine a distance that the secondary coil moved with respect to the first subset of primary coils based on a total of the power supplied to the first subset of primary coils.

3. The device of claim 2:
wherein the power controller is configured to equate an increase in the total power supplied to the first subset of primary coils with movement of the secondary coil closer to the first subset of primary coils; and
wherein the power controller is configured to equate a decrease in the total power supplied to the first subset of primary coils with movement of the secondary coil away from the first subset of primary coils.

4. The device of claim 2:
wherein the power controller is configured to supply the power to the first subset of primary coils if the distance from the secondary coil to the first subset of primary coils is less than a threshold distance; and
wherein the power controller is configured to supply the power to the second subset of primary coils if the distance from the secondary coil to the first subset of primary coils is greater than the threshold distance.

5. The device of claim 1:
wherein the power controller is configured to determine a rotation of the secondary coil about the first subset of primary coils based on the ratio of power supplied to one primary coil in the first subset of primary coils divided by the power supplied to all primary coils in the first subset of primary coils.

6. The device of claim 5:
wherein the power controller is configured to supply the power to the first subset of primary coils if the rotation from the secondary coil to the first subset of primary coils is less than a threshold rotation; and
wherein the power controller is configured to supply the power to the second subset of primary coils if the rotation from the secondary coil to the first subset of primary coils is greater than the threshold rotation.

7. The device of claim 1:
wherein the power controller is configured to detect the movement based additionally on a self-inductance of the secondary coil.

8. The device of claim 7:
wherein the power controller is configured to determine a distance between the primary coils and the secondary coil based on the self-inductance of the secondary coil.

9. The device of claim 8:
wherein the primary coils are coupled to a ferrite sheet.

10. The device of claim 1:
wherein the power supplied to the subsets of primary coils is constant.

11. The device of claim 1:
wherein the power supplied to either the first subset of primary coils or the second subset of primary coils is a same amount.

12. The device of claim 1:
wherein if the power controller is configured to supply power to the first subset of primary coils, then the power controller is configured to not supply power to any of the primary coils that are not part of the first subset of primary coils.

13. The device of claim 1:
wherein the power controller is coupled to the set of primary coils with a power distribution matrix.

14. The device of claim 1:
wherein the first and second subsets of primary coils includes at least three primary coils.

15. The device of claim 1:
wherein the primary coils are embedded in a holding surface; and
wherein the secondary coils are embedded in a mobile device configured to be placed on the holding surface.

16. The device of claim 1:
wherein the primary coils are embedded in a wireless inductive charging pad.

17. The device of claim 16:
wherein if the power controller is configured to supply power to the first subset of primary coils, then the power controller is configured to not supply power to any other inductive coils in the inductive charging pad that are not part of the first subset of primary coils.

18. The device of claim 1:
wherein each coil in the set of primary transmit coils is substantially a same size; and
wherein the set of primary transmit coils are symmetrically distributed throughout the inductive charging pad.

19. The device of claim 1:
wherein the power controller is configured to supply short bursts of power to various subsets of the primary coils; and
wherein the power controller is configured to determine a location of the secondary inductive coils based on a total power supplied to each of the various subsets of primary coils, and a ratio of power supplied to one primary coil in each of the various subsets divided by a power supplied to all primary coils in the each of the various subsets.

20. A method for enabling an inductive power transfer device to be operated, wherein the device includes a power controller configured to be coupled to a set of primary inductive coils, and wherein the primary coils are configured to inductively transfer power to a set of secondary inductive coils, the method comprising:
distributing a set of instructions, stored on a non-transitory, tangible computer readable storage medium;
wherein the instructions include:
configuring the power controller to supply a power to a first subset of the primary coils;
configuring the power controller to supply the power to a second subset of the primary coils in response to a threshold angular movement of the secondary inductive coils with respect to the primary inductive coils; and
configuring the power controller to determine the angular movement based on the power supplied to the first subset of primary coils, and a ratio of power supplied to one primary coil in the first subset of primary coils divided by a power supplied to all primary coils in the first subset of primary coils.

* * * * *